US006958196B2

(12) United States Patent
Gorte et al.

(10) Patent No.: US 6,958,196 B2
(45) Date of Patent: Oct. 25, 2005

(54) POROUS ELECTRODE, SOLID OXIDE FUEL CELL, AND METHOD OF PRODUCING THE SAME

(75) Inventors: Raymond J. Gorte, Narberth, PA (US); John M. Vohs, Newtown Square, PA (US)

(73) Assignee: Trustees of the University of Pennsylvania, Philadelphia, PA (US)

( * ) Notice: Subject to any disclaimer, the term of this patent is extended or adjusted under 35 U.S.C. 154(b) by 12 days.

(21) Appl. No.: 10/369,598

(22) Filed: Feb. 21, 2003

(65) Prior Publication Data

US 2004/0166380 A1 Aug. 26, 2004

(51) Int. Cl.$^7$ .............................................. H01M 4/86
(52) U.S. Cl. ............................ 429/44; 429/45; 429/40; 429/41
(58) Field of Search ............................. 429/30, 33, 40, 429/41, 44, 45

(56) References Cited

U.S. PATENT DOCUMENTS

| | | | |
|---|---|---|---|
| 5,057,362 A | 10/1991 | Schroeder et al. | |
| 5,306,411 A | 4/1994 | Mazanec et al. | |
| 5,543,239 A | 8/1996 | Virkar et al. | |
| 5,591,537 A | 1/1997 | Bagger et al. | |
| 5,670,270 A | * 9/1997 | Wallin .......................... | 429/33 |
| 5,937,264 A | 8/1999 | Wallin | |
| 6,017,647 A | 1/2000 | Wallin et al. | |
| 6,089,201 A | 7/2000 | Hubbard | |
| 6,106,967 A | 8/2000 | Virkar et al. | |
| 6,117,582 A | 9/2000 | Wallin et al. | |
| 6,156,290 A | 12/2000 | Lee et al. | |
| 6,159,256 A | 12/2000 | Bonville et al. | |
| 6,166,258 A | 12/2000 | Corbin et al. | |
| 6,183,897 B1 | 2/2001 | Hartvigsen et al. | |
| 6,209,494 B1 | 4/2001 | Manikowski, Jr. et al. | |
| 6,209,508 B1 | 4/2001 | Tinney | |
| 6,214,485 B1 | 4/2001 | Barnett et al. | |
| 6,218,591 B1 | 4/2001 | Lee et al. | |
| 6,251,473 B1 | 6/2001 | Wang et al. | |
| 6,303,098 B1 | 10/2001 | Kramarz et al. | |
| 6,319,626 B1 | 11/2001 | Wallin et al. | |
| 6,458,170 B1 | 10/2002 | Visco et al. | |
| 6,632,554 B2 | 10/2003 | Doshi et al. | |
| 2002/0177031 A1 | 11/2002 | Doshi et al. | |
| 2002/0187389 A1 | 12/2002 | Wallin et al. | |
| 2003/0003237 A1 | 1/2003 | Seabaugh et al. | |
| 2004/0001990 A1 | 1/2004 | Ohshima et al. | |

OTHER PUBLICATIONS

He, et al. *Low–Temperature Fabrication of Oxide Composites for Solid–Oxide Fuel Cells* J. Am. Ceram. Soc. 87 (3) 331–36 (2004), no month available.

Huang, et al. *Characterization of Sr–Doped LaCoO$_3$–YSZ Composites Prepared by Impregnation Methods* J. of the Electrochemical Society, 151 (10) 1–0 (2004), no month available.

Huang, et al. *Fabrication of Sr–Doped LaFeO$_3$ YSZ Composite Cathodes* J. of the Electrochemical Society, 151 (4) A646–A651 (2004), no month available.

Electrical Properties of ceria–based oxides and their application to solid oxide fuels cells, K. Eguchi, T. Setoguchi, T. Inoue and H. Arai, Solid State Ionics 52 (1992), pp. 165–172 North Holland, no month available.

Physical Properties of Mixed Conductor Solid Oxide Fuel Cell Anodes of Doped CeO$_2$. Mogens Mogensen, Thomas Lindegaard, Uffe Rud Hansen and Gurli Mogensen, J. Electrochem. Soc., vol. 141, No. 8, Aug., 1994, pp. 2122–2128.

Ceria–Based Anodes for the Direct Oxidation of Methane in Solid Oxide Fuel Cells, E.S. Putna, J. Stubenrauch, J.M. Vohs, and R. J. Gorte, Langmuir, vol. 11, No. 12, 1995, pp. 4832–4837, no month available.

Evaluation of perovskite anodes for the complete oxidation of dry methane in solid oxide fuel cells, R.T. Baker, I.S. Metcalfe, P.H. Middleton and B.C.H. Steele, Solid State Ionics 72, (1994) pp. 328–333, no month available.

A Novel Solid Oxide Fuel Cell System Using the Partial Oxidation of Methane, K. Asano, T. Hibino and H. Iwahara, J. Electrochem. Soc., vol. 142, No. 10, Oct. 1995, pp. 3241–3245.

Partial Oxidation of methane for internally reformed solid oxide fuel cell, Yoshiko Hiei, Tatsumi Ishihara, Yusaku Takita, Solid State Ionics, 86–88 (1996), pp. 1267–1272, no month available.

Carbon Deposition in Steam Reforming and Methanation, Calvin H. Bartholomew, Catalysis Reviews–Sci. Eng., 24(1), 67 (1982), no month available.

Electrical properties of transition–metal doped YSZ, T. Kawada, N. Sakai, H. Yokokawa and M. Dokiya, Solid State Ionics, 53–56 (1992) 418–425, North Holland, no month available.

Effect of Mixed–Conducting Interfacial Layers on Solid Oxide Fuel Cell Anode Performance, Tsepin Tsai and Scott A. Barnett, J. Electrochem. Soc., vol. 145, No. 5, May 1998.

Configurational and Electrical Behavior of Ni–YSZ Cermet with Novel Microstructure for Solid Oxide Fuel Cell Anodes, Teruhisa Horita, Natsuko Sakai, Harumi Yokawa and Masayuki Dokiya, J. Electrochem. Soc., vol. 144, No. 2, Feb. 1997.

(Continued)

*Primary Examiner*—Bruce F. Bell
(74) *Attorney, Agent, or Firm*—Hunton & Williams LLP

(57) ABSTRACT

The present invention generally relates to porous electrodes for use in solid oxide fuel cells, whereby the electrodes are comprised primarily of ceramic material and electronically conductive material. The electrodes are prepared by impregnating a porous ceramic material with precursors to the electronically conducting material.

44 Claims, 9 Drawing Sheets

OTHER PUBLICATIONS

Improved Microstructure of Ni–YSZ Cermet Anode for SOFC with a Long Term Stability, Hibiki Itoh, Tohru Yamamoto, Masashi Mori, Takao Watanabe, and Toshio Abe, Electrochemical Soc. Japan, 64, No. 6, (1996), pp. 549–554, no month available.

Kinetic and geometric aspects of solid oxide fuel cell electrodes, Mogens Mogensen, Steen Skaarup, Solid State Ionics, 86–88 (1996) pp. 1151–1160, no month available.

High Performance Catalyzed–Reaction Layer for Medium Temperature Operating Solid Oxide Fuel Cells, M. Watanabe, H. Uchida, M. Shibata, N. Mochizuki, and K. Amikura, J. Electrochem. Soc. vol. 141, No. 2, Feb. 1993, pp. 342–346.

Catalytic Growth of Carbon Filaments, R. T. K. Baker, Carbon. vol. 27, No. 3, pp. 315–323, 1989, no month available.

Methane Steam Reforming Over Fe Electrodes in a Solid Electrolyte Cell, Haytham Alqahtany, Douglas Eng., and Michael Stoukides, Energy & Fuels, 1993, 7, 495–504, no month available.

Synthesis and properties of dense nickel and cobalt zirconia cermet anodes for solid oxide fuel cells, N.M. Sammes, M. Brown, I. W.M. Brown, Journal of Materials Science (UK), vol. 31, No. 22, pp. 6069–6072, Nov. 15, 1996.

* cited by examiner

POROUS ELECTRODE, SOLID OXIDE FUEL CELL, AND METHOD OF PRODUCING THE SAME

FIELD OF THE INVENTION

The present invention relates generally to solid oxide fuel cells (SOFC) and to methods of their preparation. Specifically, the invention relates to porous electrodes and to methods of producing them whereby the electrodes are prepared from a porous matrix impregnated with an electron-conducting material to form a porous electrode. The electrodes can be prepared at temperatures low enough to avoid solid state reactions between, for example, the oxides used to form the matrix and oxides of the electron-conducting material.

DESCRIPTION OF THE RELATED ART

Solid oxide fuel cells have grown in recognition as a viable high temperature fuel cell technology. There is no liquid electrolyte, which eliminates metal corrosion and electrolyte management problems typically associated with the use of liquid electrolytes. Rather, the electrolyte of the cells is made primarily from solid ceramic materials that are capable of surviving the high temperature environment typically encountered during operation of solid oxide fuel cells. The operating temperature of greater than about 600° C. allows internal reforming, promotes rapid kinetics with non-precious materials, and produces high quality by-product heat for cogeneration or for use in a bottoming cycle. The high temperature of the solid oxide fuel cell, however, places stringent requirements on its fabrication materials. Because of the high operating temperatures of conventional solid oxide fuel cells (approximately 600 to 1000° C.), the materials used to fabricate the respective cell components are limited by chemical stability in oxidizing and reducing environments, chemical stability of contacting materials, conductivity, and thermomechanical compatibility.

The electrodes in solid-oxide fuel cells (SOFC) typically are prepared from a composite of an electronically conductive material with the electrolyte oxide. For example, with electrolytes made from yttria-stabilized zirconia (YSZ), the conventional anode is a Ni-YSZ, ceramic-metallic (cermet) composite (Herle, J. V., et al., *Eur. Ceram. Soc.,* 21 (10–11), 1855 (2001); Li, Y., et al., *Materials Science and Engineering B-Solid State Materials for Advanced Technology*, 86 (2), 119 (2001); Lee, J. H., et al., *Solid State Ionics*, 148 (1–2), 15 (2002)). In addition to maintaining porosity in the anode and providing a CTE (coefficient of thermal expansion) match with the electrolyte, the YSZ in the cermet extends the region into which ions can migrate, increasing the length of the three-phase boundary (TPB).

An anode containing copper previously has been prepared by impregnating a porous YSZ layer with salts of copper at temperatures lower than conventional sintering temperatures employed in manufacturing anodes. Because $Cu_2O$ and CuO melt at 1235 and 1326° C. respectively, temperatures below that necessary for densification of YSZ electrolytes, it is not possible to prepare Cu-YSZ cermets by high-temperature calcination of mixed powders of CuO and YSZ, a method analogous to that usually used as the first step to produce Ni-YSZ cermets. An alternative method for preparation of Cu-YSZ cermets therefore was developed in which a porous YSZ matrix was prepared first, followed by addition of Cu and an oxidation catalyst in subsequent processing steps (R. J. Gorte, et al., *Adv. Materials*, 12, 1465 (2000); S. Park, et al., *J. Electrochem. Soc.*, 148, A443 (2001)). Because the Cu phase in the final cermet must be highly connected, high metal loadings are necessary; and, even then, connectivity between all Cu particles in the anode structure is not assured.

A material commonly used for SOFC cathodes is a composite of YSZ with Sr-doped $LaMnO_3$ (LSM) (Yan, J. W., et al., *J. Electrochem. Soc.,* 149 (9), A1132 (2002); Koh, J. H., et al., *Solid State Ionics*, 149 (3–4), 157 (2002); Jiang, S. P., et al., *Journal of Power Sources*, 110 (1), 201 (2002); Barbucci, A., et al., *Electrochimica Acta*, 47 (13–14), 2183 (2002); Hart, N. T., et al., *J. Power Sources*, 106 (1–2), 42 (2002)). Just as with the Ni cermets, YSZ in the LSM-YSZ composite provides a path for ion migration in order to extend the TPB region within the cathode.

Great care usually must be taken in the preparation of oxide composites, like that of LSM and YSZ, so as to avoid solid-state reactions that lead to insulating phases (Kindermann, L., et al., *J. Electrochem. Soc.* 144, 717 (1997); Kamata, H., et al., *Mater. Res. Bull.* 30, 679 (1995); Stochniol, G., et al., *J. Am. Ceram. Soc.* 78, 929 (1995); and Kostogloudis, G. C., et al., *Solid State Ionics*, 135 (1–4), 529 (2000)). In general, the two oxide phases are fabricated separately, physically mixed, and then calcined (Kim, J. D., et al., *Solid State Ionics*, 143 (3–4) 379 (2001); Choi, J. H., et al., *Electrochimica Acta*, 46, 867 (2001)).

The calcination temperature must be high enough to sinter the ion-conducting component in the electrode to the electrolyte, but this temperature must be low enough to prevent solid-state reactions. In the case of LSM-YSZ composites, calcination above 1250° C. is recognized as leading to $La_2Zr_2O_7$ (Takeda, Y., et al., *Electrochemistry,* 68 (10), 764 (2000); Mitterdorfer, A., et al., *Solid State Ionics*, 111 (3–4) 185, (1998); Murata, K., et al., *J. Ceram. Soc. Japan*, 110 (7) 618, (2002)). Since YSZ powders do not sinter to a significant extent appreciably below 1100° C., the conditions for achieving optimal electrode properties from oxide composites are rather limited. Indeed, it is not possible to prepare some oxide composites due to the fact that the sintering temperature for YSZ is higher than the temperature at which solid-state reactions occur between the two oxides.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

It would be desirable to provide a solid oxide fuel cell that has high fuel efficiency, high electrode electrical conductivity, high power, and is capable of directly oxidizing hydrocarbons. It also would be desirable to provide electrode and cathode materials, and methods of preparing the electrode and cathode materials for use in solid oxide fuel cells, whereby the materials can be fabricated at lower temperatures to avoid solid state reactions.

A feature of an embodiment of the invention therefore is to provide a solid oxide fuel cell that has high fuel efficiency, high electrode electrical conductivity, high power, and is capable of oxidizing hydrocarbons. An additional feature of embodiments of the invention is to provide porous electrode materials, methods of making the electrode materials, and methods of making the solid oxide fuel cells.

In accordance with these and other features of various embodiments of the present invention, there is provided a cathode comprising a porous ceramic matrix and an electronically conducting material dispersed at least partially within the porous ceramic matrix, wherein the porous ceramic matrix includes a plurality of pores having a pore size of at least about 0.5 μm.

In accordance with an additional feature of an embodiment of the present invention, there is provided a cathode comprising a porous ceramic matrix and an electronically conducting material dispersed at least partially within the porous ceramic matrix, wherein the cathode has a porosity within the range of from about 10% to about 75%.

In accordance with another feature of an embodiment of the invention, there is provided a cathode comprising a porous ceramic matrix and an electronically conducting material dispersed at least partially within the porous ceramic matrix, the porous ceramic matrix being defined by a plurality of pores defined by an inner pore wall, whereby the inner pore wall of at least a portion of the plurality of pores is coated with the electronically conducting material.

In accordance with an additional feature of an embodiment of the invention, there is provided an electrode comprising a porous ceramic matrix and Sr-doped $LaCrO_3$ (LSC), whereby the electrode is prepared in accordance with the methods described herein, and has the physical properties described herein (e.g., pore size, porosity, coating of pore walls, etc.). An embodiment of the invention also includes a solid oxide fuel cell containing the electrode, methods of making the electrode, and methods of making the solid oxide fuel cell.

In accordance with an additional feature of an embodiment of the invention, there is provided a cathode comprising a porous ceramic matrix and an electronically conducting material dispersed at least partially within the pores of the porous ceramic matrix, whereby the cathode was prepared by impregnating the porous ceramic matrix material with precursors to the electronically conducting material and heating the mixture to a temperature high enough to form the conductive phase but low enough to prevent a solid state reaction from taking place between the ceramic matrix and the electronically conducting material.

In accordance with another feature of an embodiment of the invention, there is provided a method of making a porous cathode comprising forming a porous ceramic matrix, impregnating the porous ceramic matrix with a solution containing precursors to the electronically conducting material, and heating the mixture to a temperature low enough to prevent a solid state reaction from taking place between the ceramic matrix and the electronically conducting material.

In accordance with another feature of an embodiment of the invention, there is provided a solid oxide fuel cell comprising a solid electrolyte, an anode material, and a cathode comprising a porous ceramic matrix and an electronically conducting material at least partially dispersed within the porous ceramic matrix, wherein the porous ceramic matrix includes a plurality of pores having a pore size of at least about 0.5 μm.

In accordance with another feature of an embodiment of the invention, there is provided a solid oxide fuel cell comprising a solid electrolyte, an anode material, and a cathode comprising a porous ceramic matrix and an electronically conducting material at least partially dispersed within the porous ceramic matrix, wherein the cathode has a porosity within the range of from about 10% to about 75%.

In accordance with yet another feature of an embodiment of the invention, there is provided a method of making a solid oxide fuel cell comprising forming a porous ceramic matrix material having at least two opposing surfaces, contacting one of the surfaces with precursors to an anode material, and contacting the opposing surface with precursors to a cathode material. The cathode material includes an ion conducting material and is formed by heating the cathode precursors within the porous ion-conducting material to a temperature high enough to form the conductive phase but low enough to prevent a solid state reaction from taking place between the ceramic matrix and the electronically conducting material.

These and other features and advantages of the preferred embodiments will become more readily apparent when the detailed description of the preferred embodiments is read in conjunction with the attached drawings.

DETAILED DESCRIPTION OF THE PREFERRED EMBODIMENTS

Figure 1:
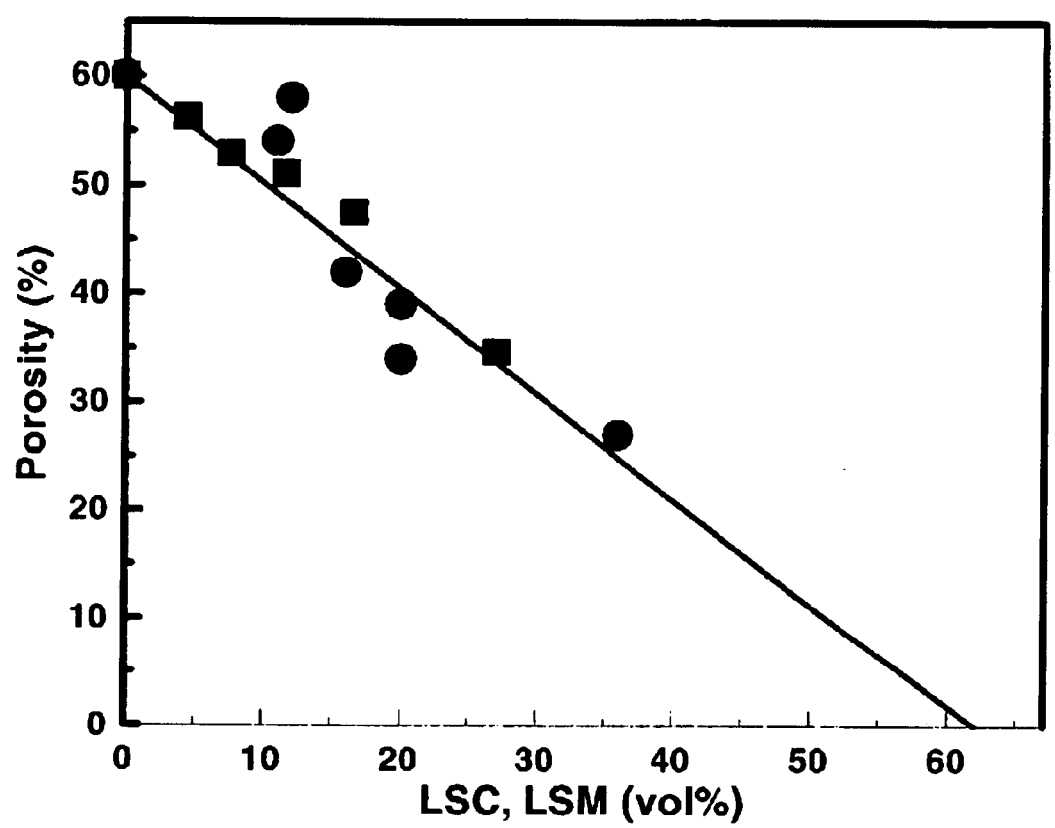
FIG. 1 is a graph showing the porosity of composites prepared in accordance with the present invention having varying concentrations of electronically conducting material.

The terminology used herein is for the purpose of describing particular embodiments only, and is not intended to limit the scope of the present invention. As used throughout this disclosure, the singular forms "a," "an," and "the" include plural reference unless the context clearly dictates otherwise. Thus, for example, a reference to "a solid oxide fuel cell" includes a plurality of such fuel cells in a stack, as well as a single cell, and a reference to "a cathode" is a reference to one or more cathodes and equivalents thereof known to those skilled in the art, and so forth.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods, devices, and materials are now described. All publications mentioned herein are cited for the purpose of describing and disclosing the various anodes, electrolytes, cathodes, and other fuel cell components that are reported in the publications and that might be used in connection with the invention. Nothing herein is to be construed as an admission that the invention is not entitled to antedate such disclosures by virtue of prior invention.

Generally, an SOFC is constituted of an air electrode (cathode), a fuel electrode (anode), and a solid oxide electrolyte provided between these two electrodes. In a SOFC, the electrolyte is in solid form. Typically, the electrolyte is made of a nonmetallic ceramic, such as dense yttria-stabilized zirconia (YSZ) ceramic, that is a nonconductor of electrons, which ensures that the electrons must pass through the external circuit to do useful work. As such, the electrolyte provides a voltage buildup on opposite sides of the electrolyte, while isolating the fuel and oxidant gases from one another. The anode and cathode are generally porous, with the cathode oftentimes being made of doped lanthanum manganite (e.g., LSM), doped lanthanum ferrate (LSF), or doped lanthanum cobaltate (LSCo). In the solid oxide fuel cell, hydrogen or a hydrocarbon is commonly used as the fuel and oxygen or air is used as the oxidant.

The SOFC of the present invention can include any solid electrolyte and any anode made using techniques disclosed in the art. The present invention is not limited to any particular material used for the electrolyte or anode, nor is it particularly limited to their respective methods of manufacture. A particularly preferred anode for use in the invention is described in U.S. patent application Publication Nos. 20010053471 and 20010029231, the disclosures of which are incorporated by reference herein in their entirety. Another particularly preferred anode for use in the invention is the LSC/YSZ composite anode prepared in accordance with the invention, as described in more detail herein.

In a similar manner, the invention is not particularly limited to any design of the SOFC. Several different designs for solid oxide fuel cells have been developed, including, for example, a supported tubular design, a segmented cell-in-series design, a monolithic design, and a flat plate design. All of these designs are documented in the literature, including, for example, those described in Minh, "High-Temperature Fuel Cells Part 2: The Solid Oxide Cell," *Chemtech.*, 21:120–126 (1991).

The tubular design usually comprises a closed-end porous zirconia tube exteriorly coated with electrode and electrolyte layers. The performance of this design is somewhat limited by the need to diffuse the oxidant through the porous tube. Westinghouse has numerous U.S. patents describing fuel cell elements that have a porous zirconia or lanthanum strontium manganite cathode support tube with a zirconia electrolyte membrane and a lanthanum chromate interconnect traversing the thickness of the zirconia electrolyte. The anode is coated onto the electrolyte to form a working fuel cell tri-layer, containing an electrolyte membrane, on top of an integral porous cathode support or porous cathode, on a porous zirconia support. Segmented designs proposed since the early 1960s (Minh et al., Science and Technology of Ceramic Fuel Cells, Elsevier, p. 255 (1995)), consist of cells arranged in a thin banded structure on a support, or as self-supporting structures as in the bell-and-spigot design.

A number of planar designs have been described that make use of freestanding electrolyte membranes. A cell typically is formed by applying single electrodes to each side of an electrolyte sheet to provide an electrode-electrolyte-electrode laminate. Typically these single cells are then stacked and connected in series to build voltage. Monolithic designs, which characteristically have a multi-celled or "honeycomb" type of structure, offer the advantages of high cell density and high oxygen conductivity. The cells are defined by combinations of corrugated sheets and flat sheets incorporating the various electrode, conductive interconnect, and electrolyte layers, with typical cell spacings of 1–2 mm for gas delivery channels.

U.S. Pat. No. 5,273,837 describes sintered electrolyte compositions in thin sheet form for thermal shock resistant fuel cells. The method for making a compliant electrolyte structure includes pre-sintering a precursor sheet containing powdered ceramic and binder to provide a thin flexible sintered polycrystalline electrolyte sheet. Additional components of the fuel cell circuit are bonded onto that pre-sintered sheet including metal, ceramic, or cermet current conductors bonded directly to the sheet as also described in U.S. Pat. No. 5,089,455. U.S. Pat. No. 5,273,837 describes a design where the cathodes and anodes of adjacent sheets of electrolyte face each other and where the cells are not connected with a thick interconnect/separator in the hot zone of the fuel cell manifold. These thin flexible sintered electrolyte-containing devices are superior due to the low ohmic loss through the thin electrolyte as well as to their flexibility and robustness in the sintered state.

Another approach to the construction of an electrochemical cell is disclosed in U.S. Pat. No. 5,190,834 Kendall. The electrode-electrolyte assembly in that patent comprises electrodes disposed on a composite electrolyte membrane formed of parallel striations or stripes of interconnect materials bonded to parallel bands of electrolyte material. Interconnects of lanthanum cobaltate or lanthanum chromite bonded to a yttria stabilized electrolyte are suggested. The SOFC of the present invention may be prepared using any of the techniques described above to provide the desired design, albeit a tubular cell, a monolithic cell, a flat plate cell, and the like. Using the guidelines provided herein, those skilled in the art will be capable of fabricating a SOFC including the inventive cathode having any desired design configuration.

The invention preferably includes a porous cathode, a method of making the cathode, and a solid oxide fuel cell containing the cathode. The inventive cathode comprises a porous ceramic matrix, which is an ion conductor, often the same material as that used for the electrolyte, and an electronically conducting material dispersed at least partially within the porous matrix. The porous ceramic matrix includes a plurality of pores having a pore size of at least about 0.5 $\mu$m. The invention also includes a cathode whereby the cathode has a porosity within the range of from about 10% to about 75%. The invention further includes a cathode comprising a porous ceramic matrix and an electronically conducting material dispersed at least partially within the porous ceramic matrix, the porous ceramic matrix being defined by a plurality of pores defined by an inner pore wall, whereby the inner pore wall of at least a portion of the plurality of pores is coated with the electronically conducting material.

The invention also preferably includes a porous electrode, a method of making the electrode, and a solid oxide fuel cell containing the electrode. The inventive electrode comprises a porous ceramic matrix, which is an ion conductor, often the same material as that used for the electrolyte, and LSC dispersed at least partially within the porous matrix. The porous ceramic matrix includes a plurality of pores having a pore size of at least about 0.5 $\mu$m. The invention also includes the above electrode a porosity within the range of from about 10% to about 75%. The invention further includes an electrode comprising a porous ceramic matrix and LSC dispersed at least partially within the porous ceramic matrix, the porous ceramic matrix being defined by a plurality of pores defined by an inner pore wall, whereby the inner pore wall of at least a portion of the plurality of pores is coated with the LSC.

The invention is not particularly limited to any type of ceramic material for use in forming the porous ceramic matrix. It is preferred that the cathode is comprised of stabilized YSZ impregnated with cathode electronically conducting material. Preferred ceramics for use in the invention include, but are not limited to YSZ, Gd- and Sm-doped ceria (10 to 100 wt %), Sc-doped $ZrO_2$ (up to 100 wt %), doped $LaGaMnO_x$, and other electrolyte materials.

The electronically conducting material for use in the cathode of the invention includes any of the known cathode materials, as well as any cathode materials later discovered. Cathode materials preferably suitable for use in the invention include composites with Sr-doped $LaMnO_3$, $LaFeO_3$, and $LaCO_3$, $LaCrO_3$, or metals such as Ag. A particularly preferred cathode materials is Sr-doped $LaMnO_3$ (LSM). When formulated into the cathode together with porous YSZ, these electronically conducting materials preferably have the formulae $La_{0.7}Sr_{0.3}CrO_{3-\delta}$/YSZ, $La_{0.8}Sr_{0.2}MnO_{3-\delta}$/YSZ, $La_{0.8}Sr_{0.2}FeO_{3-\delta}$/YSZ, and $La_{0.8}Sr_{0.2}CoO_{3-\delta}$/YSZ.

The invention is not limited to any particular material used for the anode. For example, nickel, ceria, Sr-doped $LaCrO_3$, (LSC) doped $SrTiO_3$, copper, cobalt, iron, silver, or magnesium may be used, together with a ceramic material such as any of the ceramic materials described above for use in fabricating the inventive cathode. A particularly preferred anode is a copper/ceria/YSZ anode that is capable of directly oxidizing hydrocarbons without reformation of the hydrocarbon.

After fabricating the cathode, anode, and/or both, the anode may be treated such that it contains carbonaceous deposits that are formed by exposing the electrode to a hydrocarbon. Preferably, the anode is exposed to butane or larger hydrocarbons, which provides superior enhancement when compared to exposure to methane. The anode materials preferably are exposed to the hydrocarbon at temperatures within the range of from about 500 to about 900° C., more preferably from about 600 to about 800° C., and most preferably at about 700° C. The exposure to the hydrocarbon can last anywhere from about 1 minute to 24 hours, preferably, from about 5 minutes to about 3 hour, and most preferably from about 10 minutes to about 1 hour, 30 minutes. The anode materials can be exposed to the hydrocarbon once, or numerous times.

The amount of carbon formed on the anode is believed to reach an equilibrium and consequently, the carbon formed does not completely coat the electrode to render it ineffective. While not intending on being bound by any theory, the inventors believe that minor amounts of hydrocarbon residues are deposited on the surface of the anode and fill the gaps between the electron-conducting particles when metals or conductive oxides are included in the electrode composition, or provides a conductive film in the absence of these other components. As shown in FIG. 9(b), there may be gaps between the conductive particles and the surface of the electrode that may lead to decreased conductivity. After treatment with a hydrocarbon, e.g., methane, butane, etc., the hydrocarbon residues that are formed fill the gaps and improve the conductivity to allow the flow of electrons from the surface of the electrode to the conductive particles.

The carbonaceous deposits that can optionally be formed on the electrode preferably are polyaromatic compounds, and more preferably fused benzene rings containing anywhere from 2 to 6 benzene rings fused together. These polyaromatic compounds are distinct from the graphitic carbon fibers that are typically formed when using Ni, Co, and Fe in the cathode (Toebes, M. L., et al., *Catalysis Today*, 2002). The polyaromatic compounds have a low but finite vapor pressure at 700° C.

Only small amounts of carbonaceous residue are apparently sufficient to increase the conductivity substantially. Although the inventors do not know precisely what the chemical form of the residue might be, the quantity necessary to significantly enhance performance appears to correspond to no more than about 10 wt %, preferably no more than about 5 wt %, and most preferably no more than about 2 wt %, based on the total weight of the electrode. If the density for the residue is assumed to be about 1 $g/cm^3$, a value typical for hydrocarbons, the volume fraction of this residue is less than 5%, based on the volume of the electrode. If the density for the residue is assumed to be more similar to that of graphite, the volume occupied by the residue would be even lower.

Another advantage of treating the electrode with hydrocarbon to form carbonaceous deposits is that even lower amounts of ion or electron conducting materials are required. By comparison, the minimum metal content for metal-containing cermet anodes and cathodes is reported to be about 30 vol % (Dees, D. W., et al., *J. Electrochem. Soc.*, 134, 2141 (1987)).

It is preferred in the invention that the amount of electronically conducting material in the electrode (cathode or anode) is from about 1% to about 60% by volume, based on the total volume of the electrode, more preferably from about 5% to about 50% by volume, and most preferably from about 15% to about 50% by volume. It is most preferred in the present invention that when LSC is employed as the electronically conducting material in the electrode (preferably an anode), the amount is within the range of from about 20 to about 40% by volume, even more preferably about 35% by volume, based on the total volume of the cathode. It also is most preferred in the present invention that when LSM is employed as the electronically conducting material, the amount is within the range of from about 20 to about 55% by volume, even more preferably about 48% by volume, based on the total volume of the cathode.

Figure 8:
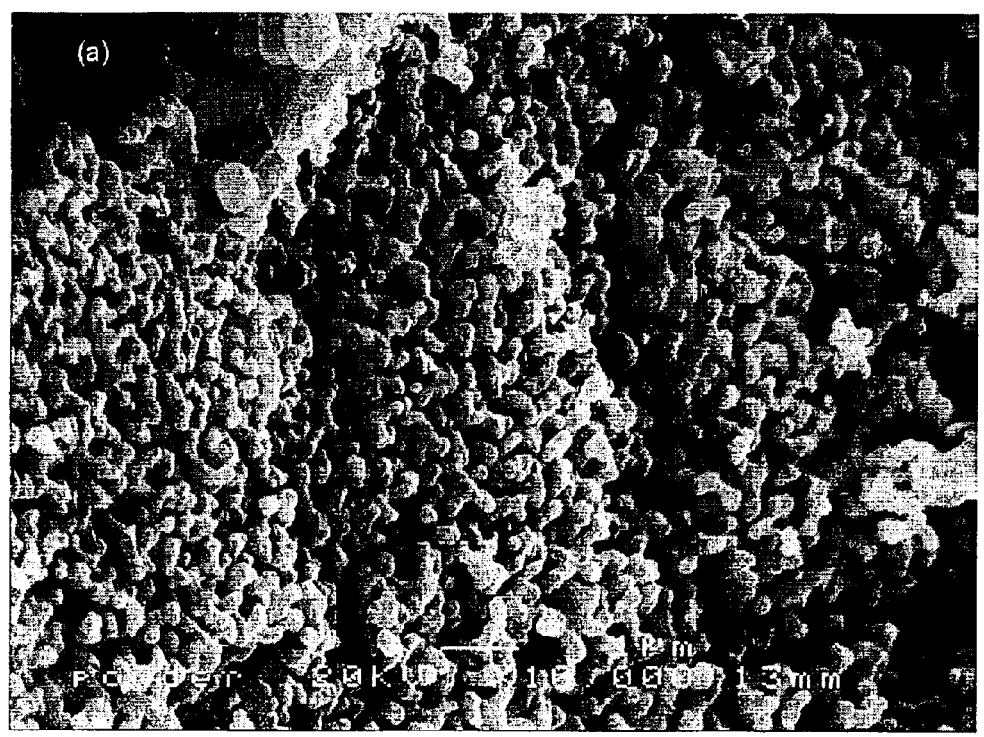
FIG. 8 is an SEM microstructure of a LSC/YSZ composite manufactured using conventional methods (a).

The electrodes of the present invention have increased electrical conductivity at much lower concentrations of the electronically conducting material, when compared to conventional electrodes. In addition, the electrodes of the invention exhibit percolation behavior at much lower concentrations, when compared to conventional electrodes which is believed to be due to the fact that the conductive phase is not random, but coats the pores of the oxide matrix. The microstructure of the fracture interfaces of LSC/YSZ prepared in accordance with a conventional method (e.g., mixing the powders together and sintering—method a), and prepared in accordance with the invention (e.g., forming a porous YSZ layer, impregnating the layer with solutions of cathodic material, and then heating—method b) are shown in FIGS. 8 and 9(b). It can be seen that the particles of YSZ and LSC were completely dispersed into each other for the conventional method a. For these electrodes, the conductivity is almost the same as that of YSZ at lower ion conducting particle loading, and percolation behavior will occur only at relatively high concentrations of ion conducting material.

While not intending on being bound by any theory, the inventors believe that the percolation behavior can be explained by the presence of two conduction mechanisms through the composite electrode: (i) an electronic path through LSC as an anode, or LSM as a cathode; and (ii) an ionic path through both YSZ and LSC or LSM. Below the percolation threshold, the conductivity of the composite is similar to that of YSZ, indicating only an ionic conduction path through the YSZ phase. Above the percolation threshold, the conductivity will be greatly enhanced, which corresponds to a change in mechanism from ionic conduction to electronic conduction through the LSC or LSM perovskite. For the inventive electrodes (method b), the LSC or LSM solution can be adsorbed throughout the interface of porous YSZ. A nanometer particle layer or a thin film of the conductive phase can be formed relatively homogeneously along the surface of YSZ after sintering, resulting in improved LSC or LSM particle-to-particle contact even at low concentration. Therefore the continuous conductive perovskite phase can increase the conductivity, and the percolation threshold for the conductivity can be found at lower loading. For conventional electrodes (method a), the percolation threshold is at much higher concentrations of ion conducting material due to its admixture with the YSZ.

The inventive electrodes preferably have a porous structure with a plurality of pore having a pore size greater than about 0.5 $\mu$m. Not all the pores need to have a pore size greater than about 0.5 $\mu$m, but it is preferred that more than 50%, preferably more than 60% and most preferably more than 75% of the pores have a pore size greater than about 0.5 $\mu$m. The pore size is determined by measuring the distance along the major dimension of the pore. It is preferred in the present invention that a plurality of pores have a pore size greater than about 0.75 $\mu$m, more preferably greater than about 1 $\mu$m, and even more preferably greater than about 1.5 $\mu$m.

The porosity of the electrode prior to dispersing the ion conducting material typically is about 55 to about 75%. The porosity is measured by immersing the sintered product in water and comparing its weight after immersion with that prior to immersion, as described in Kim, H., et al., *J. Am. Ceram. Soc.*, 85, 1473 (2002). The difference yields the weight of water dispersed in the pores, which when divided by the density will yield the volume of the pores. The porosity then can be determined simply by dividing the volume of the pores by the total volume of the sintered product. Most preferably, the porosity of the sintered electrolyte product prior to dispersing the electronically conducting material is about 60%.

The porosity of the electrode after dispersing the ion conducting material can be anywhere from about 10% to about 75%, more preferably from about 10% to about 40% and most preferably from about 12% to about 30%. The porosity of the electrode will depend in part on the amount of electronically conducting material used, as shown in FIG. 1.

The invention further includes a method of making the above-described electrode. In accordance with the method, it is preferred first to form a powder of the electrolyte material, most preferably yttria stabilized zirconia (YSZ), and tape casting to form a two-layer, green tape of YSZ (one layer for the cathode and the other for the electrolyte). The powder can be mixed together with conventional dispersants, binders, pore formers, and water. The two-layer green tape then preferably is sintered at temperatures within the range of from about 1,200 to about 1,800° C., preferably from about 1,350 to about 1,650° C., and most preferably from about 1,500 to about 1,550° C. to form a porous matrix of YSZ near the surface from the first layer, and dense layer of YSZ from the second layer. Sintering the two-layer tape in this manner results in a YSZ wafer having a dense side, approximately 5 to about 200 $\mu$m thick, supported by a porous layer, approximately 400 to about 800 $\mu$m thick, more preferably about 600 $\mu$m thick. In a preferred method, a three layer YSZ structure is fabricated using the above-described method to form a porous, dense, porous matrix. The dense electrolyte layer preferably is fabricated to be as thin as possible, since the thickness of the electrolyte can be limiting. The optimal thickness of the outer porous electrode layers (cathode and anode) may be within the range of from about 40 to about 500 microns.

The electrode preferably is formed by impregnating the porous YSZ portion of the wafer with an aqueous solution containing precursors to the electronic conducting material. For example, the porous YSZ portion can be impregnated with an aqueous solution containing the appropriate concentrations of the nitrate salts of La, Sr, and either Mn (for LSM as a cathode) or Cr (for LSC as an anode). For example, preferred salts useful for forming a porous cathode include saturated, aqueous solutions of $La(NO_3)_3$, $Sr(NO_3)_3$ and $Mn(acetate)_2$. The impregnated porous ceramic material then is calcined at a temperature sufficient to decompose the nitrate ions and form the conductive, perovskite phase. The calcination temperature preferably is lower than the temperature at which solid state reactions occur between the oxides of the ion conducting material and the porous ceramic matrix. Preferably, when LSF is the cathode material, the temperature is below 1100° C., and when LSCo(the cobaltate) is the cathode material, the temperature is below 1000° C. When LSC is used as the electrode, preferably the anode material, calcination preferably is carried out at a temperature within the range of from about 800 to about 1200° C., more preferably from about 1,000 to about 1,200° C., and most preferably about 1,100° C. Preferably, when LSM is the cathode material, calcination is carried out at a temperature within the range of from about 700° C. to about 1300° C., more preferably from about 800 to about 1,300° C., and most preferably about 1,200° C. The conductive phase of the cathode of the invention therefore can be formed at relatively low temperatures; temperatures lower than the temperature in which solid state reactions would occur. Indeed, when using LSM as the cathode, the cathode material is conductive by 800° C. Thus, the porous ceramic matrix may be impregnated with the nitrate solutions described above, and then the conductive phase formed when the fuel cell is heated to its operating temperature. This provides a distinct advantage and significant savings in manufacturing costs. These low temperatures also can avoid the appearance of secondary phases but still provide cathodes having a conductive phase that conventionally required sintering at higher temperatures.

Another feature of an embodiment of the invention is a SOFC that comprises the inventive composite electrode, albeit a cathode, or an anode comprising LSC. Preferably, the SOFC includes an air electrode (cathode), a fuel electrode (anode), optionally an LSC/YSZ composite fuel electrode of the invention, and a solid oxide electrolyte disposed at least partially between these two electrodes. In a SOFC, the electrolyte is in solid form. Any material now known or later discovered can be used as the anode material and as the electrolyte material. Typically, the electrolyte is made of a nonmetallic ceramic, such as dense yttria-stabilized zirconia (YSZ) ceramic, the anode is comprised of a nickel cermet, copper oxide and ceria, or LSC. In the solid oxide fuel cell, hydrogen or a hydrocarbon is commonly used as the fuel and oxygen or air is used as the oxidant. Other electrolyte materials useful in the invention include Sc-doped $ZrO_2$, Gd- and Sm-doped $CeO_2$, and LaGaMnOx.

The anode preferably is formed in accordance with the methods described above for forming the cathode. Alternatively, the anode can be formed by applying the anode composition (e.g., a mixture of YSZ and NiO) as a paste onto the dense side of the wafer and then calcining the anode at a temperature within the range of from about 1,000 to about 1,300° C., more preferably within the range of from about 1,100 to about 1,200° C., and most preferably about 1,130° C. Preferably, the anode is prepared by forming an LSC/YSZ composite as described herein.

The inventive porous cathode of the invention, prepared in accordance with the methods described herein, can be used as the cathode material in the SOFC. The invention also includes a plurality of SOFCs interconnected to form a power source. Any component effective in connecting the individual SOFCs can be used in the invention.

The invention now will be explained with reference to the following non-limiting examples

EXAMPLES

Making the Electrodes

The LSC-YSZ and LSM-YSZ composite electrodes each were prepared by two methods: (a) Method A involved conventional, physical mixing of the oxide powders; and (b) Method B involved impregnation of a porous YSZ matrix with metal salts.

Comparative Method (a)

For the conventional composites, the YSZ and LSM ($La_{0.8}Sr_{0.2}MnO_3$, Praxair Surface Technologies) were used as purchased commercially. The LSM was purchased from Praxair Surface Technologies, Danbury, Conn., and the YSZ was purchased from Tosoh Corporation, Tokyo, Japan. LSC ($La_{0.7}Sr_{0.3}CrO_{3-\delta}$) was synthesized from the nitrate salts of La, Sr and Cr. After dissolving the La, Sr, and Cr salts in distilled water, the mixture was dried and calcined at 800° C. in air overnight. This powder then was ground in a mortar and pestle in the presence of iso-propanol, sintered in air at 1400° C. for 4 h, and then ground again. The resulting powder was shown to have the correct perovskite structure by x-ray diffraction (XRD) measurements. Finally, the LSM-YSZ and LSC-YSZ composites were prepared by physically mixing the oxide powders, uniaxially pressing them into wafers, and calcining the wafers to various temperatures, as described in more detail below.

Inventive Method (b)

To prepare composites by impregnation, Method B, a porous YSZ matrix first was prepared using methods described, for example, in Gorte, R. J., et al., *Adv. Materials*, 12, 1465 (2000), and Park, S., et al., *J. Electrochem. Soc.*, 148, A443 (2001). The YSZ powder ($ZrO_2$ with 8 mol % $Y_2O_3$, Tosoh TZ-84) was used as received and mixed with distilled water, a dispersant (Duramax 3005, Rohm & Haas), binders (HA12 and B1000, Rohm & Haas), and pore formers (graphite and polymethyl methacrylate). This slurry was either cast into tapes that would result in porous ceramic wafers, 600 μm thick, or formed into rectangular pieces, 2 mm×2 mm×10 mm. After calcination to 1550° C., the YSZ wafers and rectangular pieces were found to have a porosity of 60%, as shown by the weight change of the sample after water immersion. Kim, H., et al., *J. Am. Ceram. Soc.*, 85, 1473 (2002). Either LSM or LSC then were added to the porous YSZ through impregnation of the YSZ with an aqueous solution containing the appropriate concentrations of the soluble salts of La, Sr, and either Cr or Mn. Sufficient quantities of $La(NO_3)_3$, $Sr(NO_3)_3$, $Cr(NO_3)_3$, and $Mn(acetate)_2$ to prepare composites having concentrations of LSC and LSM within the range of about 30 to about 40 vol %.

The electrical conductivities were measured using a standard four-probe DC method. In this method, the samples were placed in a holder, and external platinum foils were attached to both ends. Current from a 1286 Solartron electrochemical interface was passed through the samples while monitoring the voltage across the samples using a Tenma 72-410A multimeter. The conductivities were typically measured either in air or in humidified $H_2$. For the LSM-YSZ composites, most of the samples were prepared from the rectangular pieces, while the results for the LSC-YSZ composites were obtained on 600-μm wafers. The phase and microstructure of selected samples also were also investigated using XRD and Scanning Electron Microscopy (SEM, JEOL JSM-6300LV).

Example 1

A series of porous composites were prepared in accordance with Method b above to determine whether the electronically conducting oxide material was being dispersed within the porous matrix. The porosities of a series of materials with increasing amounts of LSM or LSC were measured, with the results shown in FIG. 1. The LSC-YSZ composites in this figure were calcined to 1,100° C. and the LSM-YSZ composites were calcined to 1,250° C. For these data, the volume of the conducting oxide was determined from its mass and bulk density. The line in the figure is the expected change in porosity of the composite assuming the second oxide fills the pores. The fact that the porosity decreases as expected demonstrates that the electronically conducting oxide material is present in the pore structure following the calcination treatments.

As shown in FIG. 1, the porosity of the LSC-YSZ composite decreases from 60% by volume (e.g., porosity of YSZ matrix) at 0% LSC, to 0% at about 64% by volume LSC. It is most preferred that the concentration of LSC in the composite be on the order of about 30–35% by volume, leaving a porosity of the electrode at or about 30–35%. The porosity of the LSM-YSZ composite follows essentially the same trend. It is preferred, however, that the concentration of LSM in the composite be on the order of about 48% by volume, leaving a porosity of about 15%. It is preferred that the concentration of electronically conductive material be on the order of about 40% by volume.

LSC-YSZ Composites

Example 2

Figure 2:
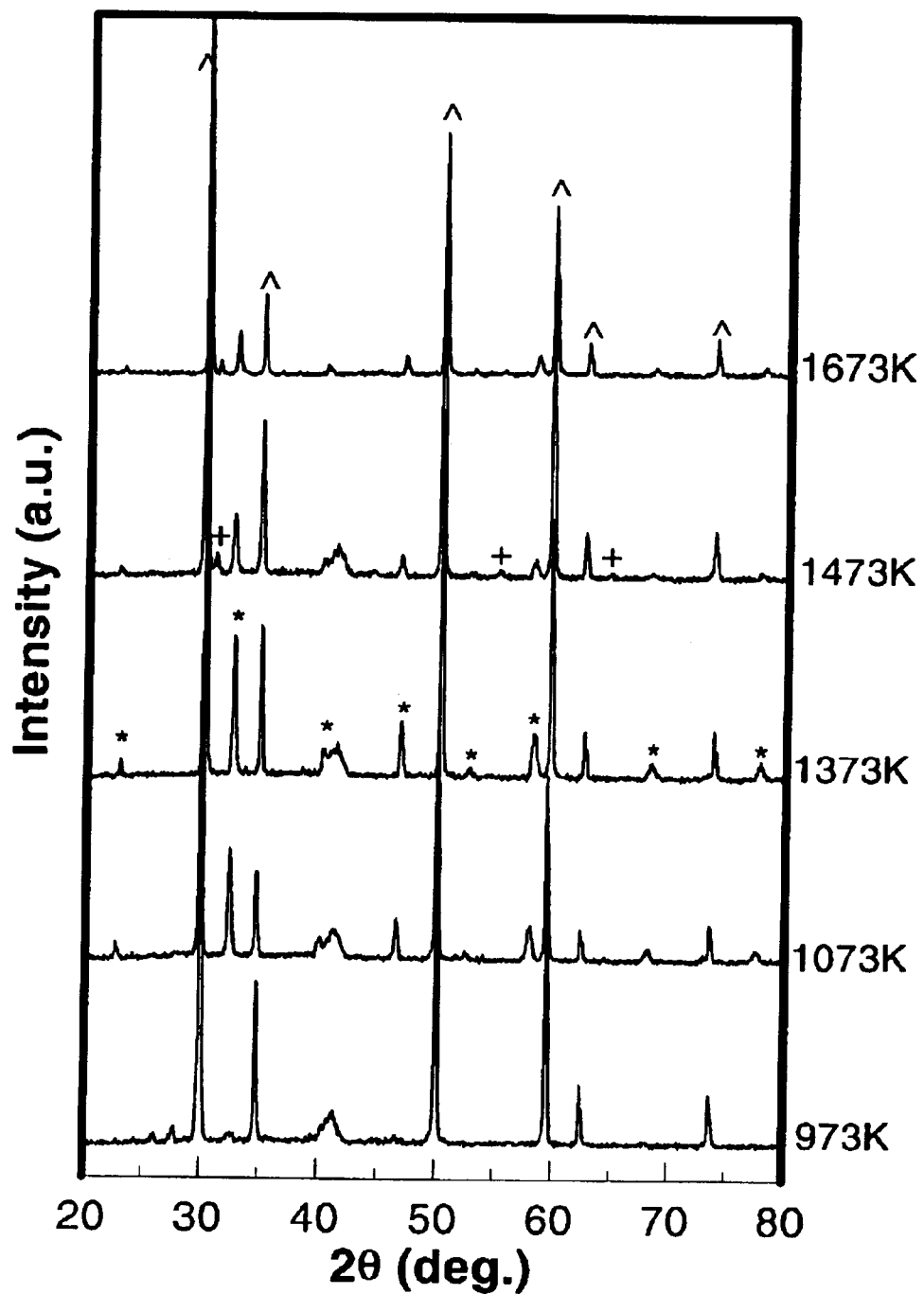
FIG. 2 illustrates XRD patterns of a LSC/YSZ composite at different calcination temperatures.

LSC-YSZ composites that preferably can be used as an anode material were prepared in accordance with method b above. To determine the optimum calcination temperature, method b was repeated at different temperatures, the results of which are shown in FIG. 2. FIG. 2 shows the XRD patterns following impregnation of the porous YSZ with the La, Sr, and Cr salts to a loading that would correspond to about 30 vol wt % LSC, after calcining to increasingly higher temperatures. Peaks corresponding to the LSC, perovskite phase (notably, those at 41, 46, 58, 68, and 78 degrees 2θ) become apparent beginning at approximately 800° C. These peaks become sharper after calcination to 1,100° C., but new phases appear at still higher calcination temperatures. By 1,200° C., a peak appears at 31 degrees, which is believed to be attributed to the formation of $SrZrO_3$. For calcination temperatures below 1,400° C., there are also several overlapping peaks in the region near 41 degrees, which are probably associated with chromium compounds, such as CrO, $CrO_2(OH)_y$ and $Cr(OH)_y$. To prevent the formation of undesirable components that may have an adverse impact on the performance of the composite, it is preferred to prepare the composite at calcination temperatures below those in which solid state reactions occur. In this case, it is most preferred to prepare the composite at a calcination temperature of less than about 1,200° C.

Example 3

Figure 3:
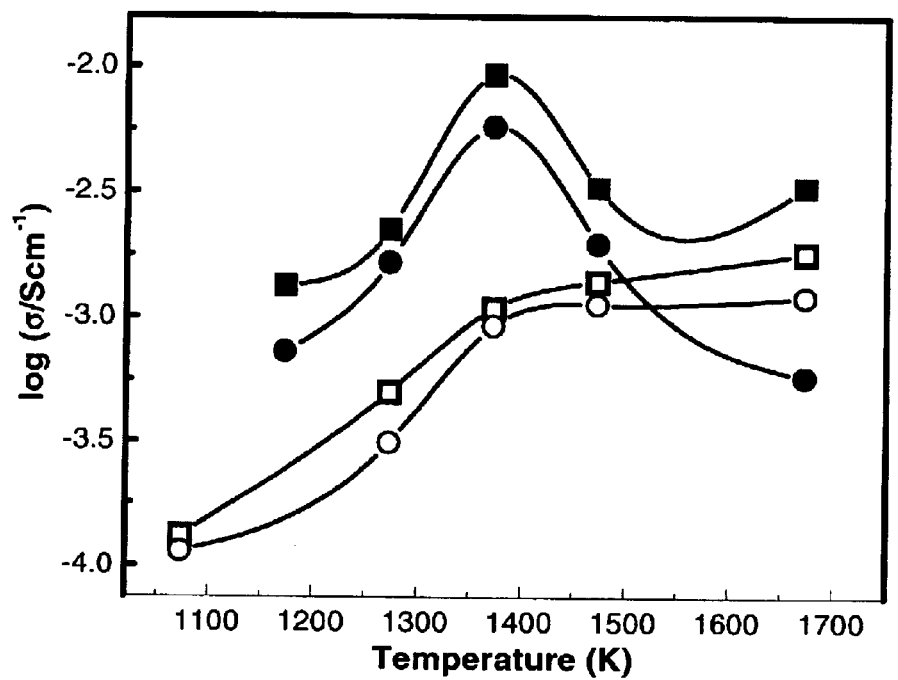
FIG. 3 is a graph showing the changes in electrical conductivity of a LSC/YSZ composite with calcination temperature.

The purpose of this example was to study the effect of calcination temperature on the electronic conductivity of the composite, the results of which are shown in FIG. 3. Two LSC-YSZ composites were prepared, both having 30 vol % LSC, but one prepared using method a and the other prepared using method b described above. The samples were calcined in air for 2 hours at various temperatures before measuring the conductivities 700° C. in both air and humidified $H_2$. For the composite prepared in accordance with method b, the conductivity was found to increase with temperature to a maximum value at or about 1,100° C., and then to decrease at still higher calcination temperatures. This is consistent with the formation of an LSC phase at 1,100° C., followed by formation of secondary phases at higher temperatures. It also is interesting that the conductivity of the composite formed at the highest temperature is sensitive to the gas-phase composition, while the composite formed at 1,100° C. is not. Since LSC remains conductive over a wide range of $P(O_2)$, this observation is further evidence that the high-temperature phase is not LSC.

For the composite prepared using method a, the conductivity increases with increasing temperature, all the way to 1,400° C., and there is not much difference between the conductivities measured in air and in $H_2$. The reason for the increased conductivity with calcination temperature is very different in this case, since the conductive LSC phase was used in the initial sample preparation. For these samples, the initial density was low and calcination enhanced the connectivity within the sample. The rather small increase in conductivity observed between the sample heated to 1,100° C. and the one heated to 1,400° C. may be due to counteracting effects, with the formation of secondary phases decreasing the conductivity and densification increasing conductivity.

Example 4

Figure 4:
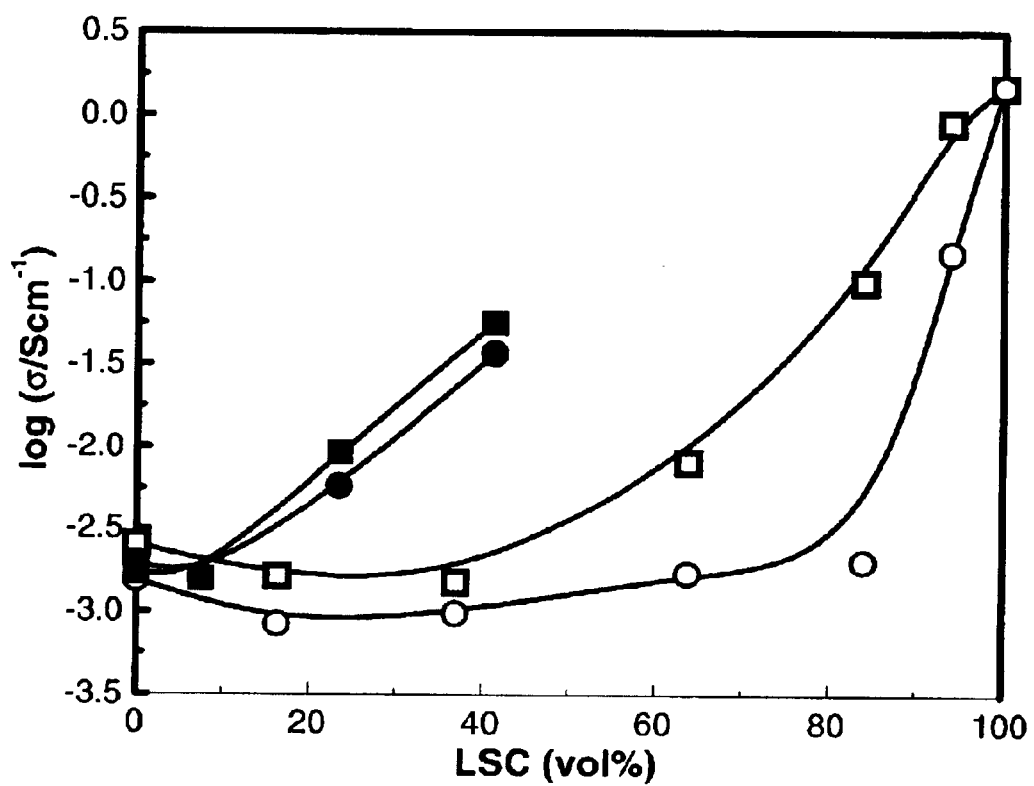
FIG. 4 is a graph showing the changes in electrical conductivity of a LSC/YSZ composite with concentration of LSC.

The purpose of this example was to study the effect of concentration of LSC on electronic conductivity, the results of which are shown in FIG. 4. Two LSC-YSZ composites were prepared, both calcined at 1,100° C. for 2 hours, but one prepared using method a and the other prepared using method b described above. The amounts of LSC employed by volume % were varied from 0 to about 100% (100% for the LSC-YSZ composite prepared in accordance with method a). The conductivities then were measured in both air and humidified $H_2$ at 700° C. The samples prepared by method b exhibited reasonably high conductivities at relatively low volume fractions of LSC. This is believed to be due in part to the fact that materials impregnated into a defined matrix cannot be considered random media. It is believed that in all likelihood, the LSC forms a coating on the walls of the YSZ pores.

For the comparative samples prepared from the mixed powders, method A, the conductivity was low until the weight fraction of LSC reached about 80%. The fact that such a high weight fraction of LSC is required, much higher than would be expected based on percolation concepts, is believed to be due to incomplete sintering and resulting low density of these powders at the low preparation temperature. It is not until the volume fraction of LSC reached about 80% that the material became denser, thereby increasing the conductivity.

LSM-YSZ Composites

Example 5

Figure 5:
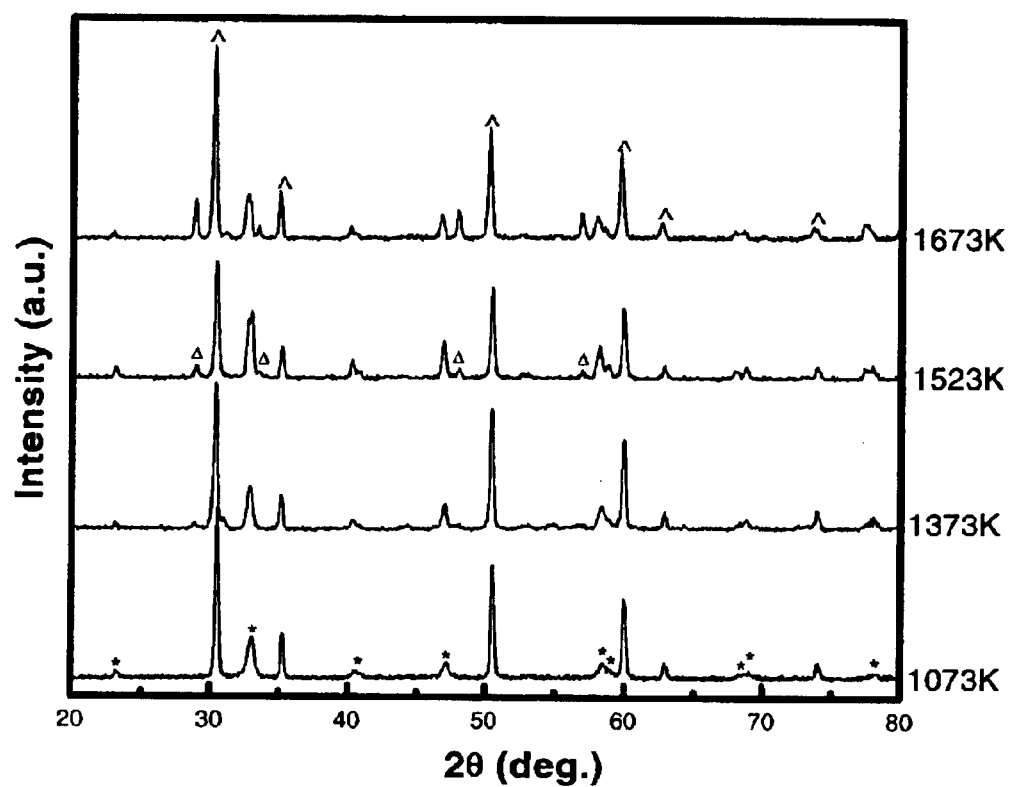
FIG. 5 illustrates XRD patterns of a LSM/YSZ composite at different calcination temperatures.

LSM-YSZ composites were prepared in accordance with method b above. To determine the optimum calcination temperature, method b was repeated at different temperatures, the results of which are shown in FIG. 5. FIG. 5 shows the XRD patterns following impregnation of the porous YSZ with the La, Sr, and Mn salts to a loading that would correspond to about 40 vol % LSM, after calcining to increasingly higher temperatures. Peaks at 23, 33, 40, 47 and 58 degrees 2θ, associated with the perovskite phase, appear already at 800° C. $La_2Zr_2O_7$ (31 degrees) is observed beginning at ~1250° C. and this increases with increasing calcination temperature.

Example 6

Figure 6:
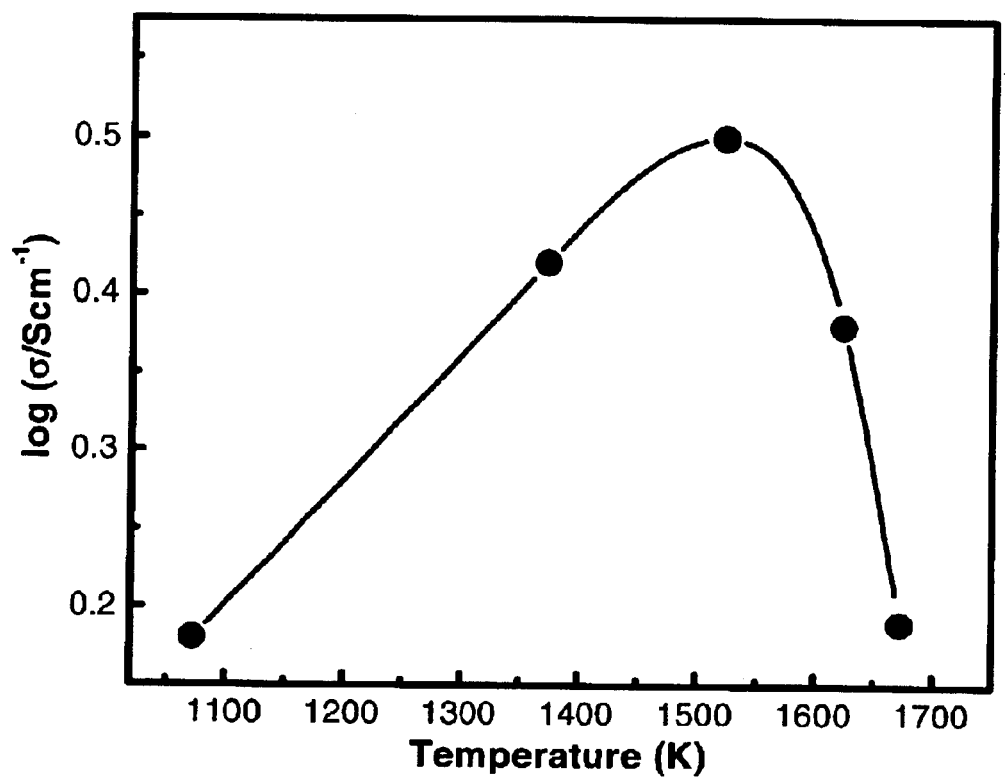
FIG. 6 is a graph showing the changes in electrical conductivity of a LSM/YSZ composite with calcination temperature.

The purpose of this example was to study the effect of calcination temperature on composite conductivity, the results of which are shown in FIG. 6. FIG. 6 shows the conductivity at 973 K, in air, of an LSM-YSZ composite, prepared by impregnation and having a composition of 40 vol % LSM, as a function of calcination temperature. Similar to what occurs with the LSC-YSZ composites, the conductivity reaches a maximum with calcination temperature; however, the maximum conductivity is now achieved at approximately 1,250° C. It is interesting that the absolute change in conductivity is relatively small in this case and the conductivity of the composite is already quite high at 800° C., indicating that reasonable performance should be achieved at low temperatures. It also is interesting that the optimal temperature, 1,250° C., is the recommended temperature for calcining LSM-YSZ composites that are prepared by traditional methods.

Example 7

Figure 7:
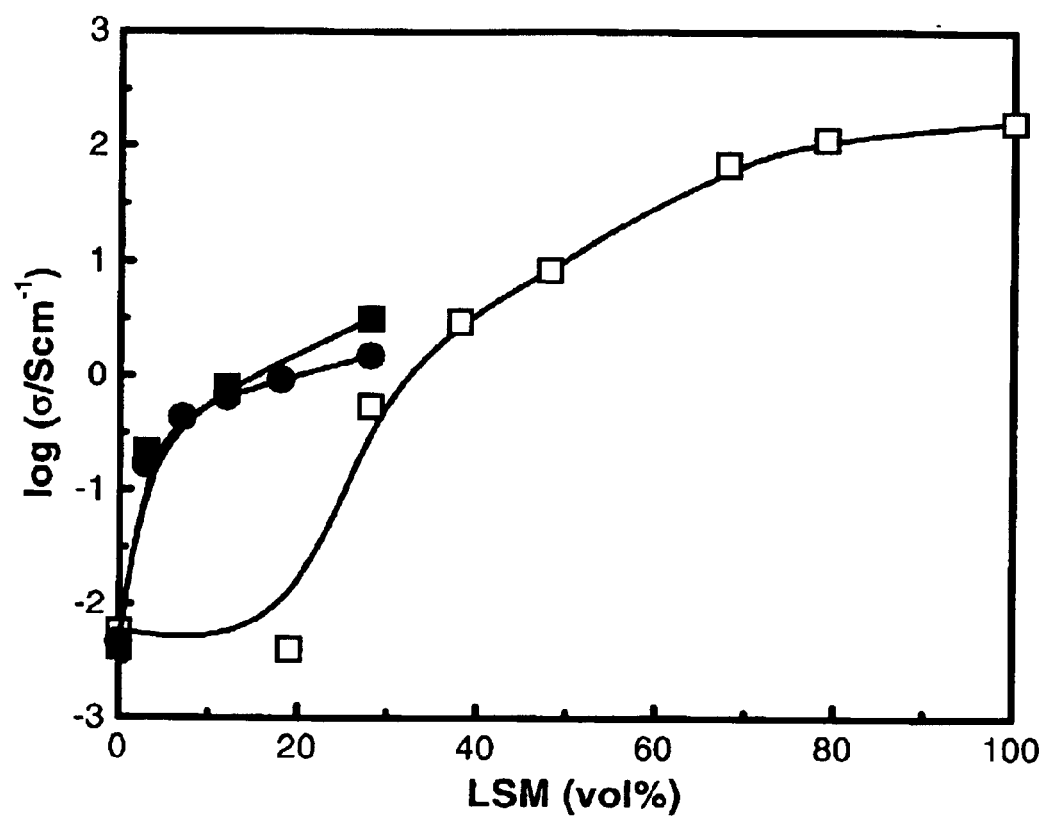
FIG. 7 is a graph showing the changes in electrical conductivity of a LSM/YSZ composite with concentration of LSM.

The purpose of this example was to study the effect of concentration of LSM on electronic conductivity, the results of which are shown in FIG. 7. Three LSM-YSZ composites were prepared, two calcined at 1,250° C. for 2 hours, and one calcined at 800° C. One set of samples calcined at 1,250° C. was prepared using method a and the other two sets of samples (one calcined at 1,250° C., and the other calcined at 800° C.), were prepared using method b described above. The amounts of LSM employed by volume % were varied from 0 to about 100% (100% for the LSM-YSZ composite prepared in accordance with method a). The conductivities then were measured in both air and humidified $H_2$ at 700° C.

The LSM-YSZ composites prepared by method a exhibited high conductivities at reasonable LSM contents, on the order of about 30% by volume. Indeed, the conductivity rose rapidly at an LSM concentration of 30 vol %, which is the expected value for percolation in random media. As observed above with the LSC-YSZ composites, the conductivity of the samples prepared in accordance with method b was much higher at lower LSM concentrations, most likely because the LSM phase is not believed to be random, given that it was impregnated into an existing structure. Finally, it is interesting that the conductivities of the LSM-YSZ composites formed by method b were equally high following calcination to only 800° C., for concentrations up to about 30% by volume. It therefore is preferred to heat the LSM-YSZ composites at temperatures lower than 1,250° C., when the concentration of LSM is less than about 30% by volume.

Example 8

Figure 9:
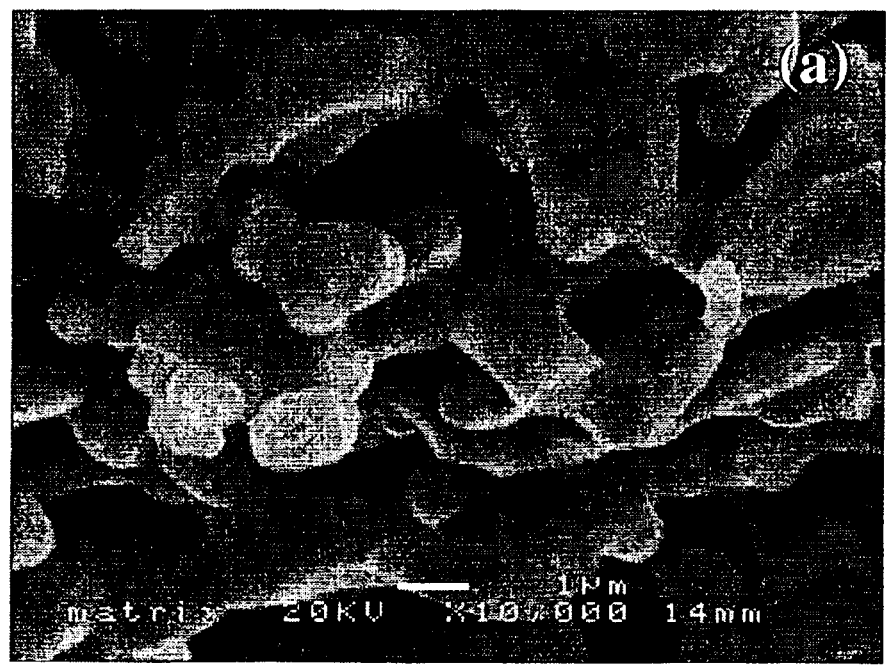
FIG. 9(a) is an SEM microstructure of a porous YSZ ceramic matrix.
FIG. 9(b) is an SEM microstructure of an LSC/YSZ composite manufacture in accordance with the inventive method (b).
Figure 9:
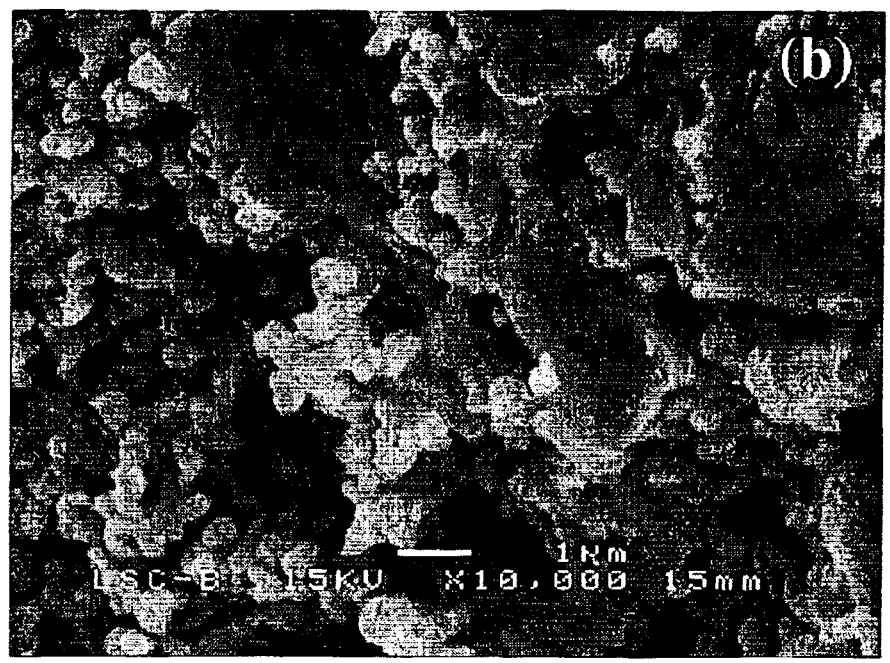

The purpose of this example was to study the change in microstructure between oxide composites prepared in accordance with method a, and those prepared in accordance with method b. FIG. 8 shows the mixed powder, with 50-vol % LSC, after calcination to 1100° C. The material consists of relatively uniform particles, ~0.2 µm in diameter, with a porosity of approximately 25%. In this sample, the YSZ and LSC particles are the same size and indistinguishable. FIG. 9 shows the porous YSZ, before and after addition of LSC to a level of 40 vol %, by impregnation of the porous YSZ with the La, Sr, and Cr salts and calcination to 1100° C. The porous, YSZ matrix, FIG. 9a), consists of relatively uniform pores, ~1 to 2 µm in size. After impregnation, 0.2 µm LSC particles are observed coating the YSZ walls, as shown in FIG. 9b). These results confirm that the oxide added by impregnation coats the YSZ walls.

Other embodiments, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A cathode comprising:
a porous ceramic material; and
at least an electronically conducting material dispersed at least partially within the pores of the porous ceramic material,
wherein the porous ceramic material includes a plurality of pores having an average pore size of at least about 0.5 µm,
wherein the cathode is prepared by sintering the porous ceramic material first, and contacting the sintered porous ceramic material with a solution containing an oxide of the electronically conducting material,
and wherein the cathode has a higher electrical conductivity at a lower concentration of electronically conducting material, when compared to a cathode prepared by sintering both the porous ceramic material and electronically conducting material without sintering the porous ceramic material first.

2. The cathode as claimed in claim 1, wherein the porous ceramic material is selected from the group consisting of YSZ, Gd- and Sm-doped ceria (10 to 100 wt %), Sc-doped $ZrO_2$ (up to 100 wt %), doped $LaGaMnO_x$, and mixtures thereof.

3. The cathode as claimed in claim 2, wherein the porous ceramic material is YSZ.

4. The cathode as claimed in claim 1, wherein the electronically conducting material is selected from the group consisting of Sr-doped $LaMnO_3$, $LaFeO_3$, and $LaCoO_3$, Ag, and mixtures thereof.

5. The cathode as claimed in claim 4, wherein the electronically conducting material is Sr-doped $LaMnO_3$.

6. The cathode as claimed in claim 1, wherein the plurality of pores have an average pore size of greater than about 1.0 µm.

7. The cathode as claimed in claim 1, wherein the plurality of pores have an average pore size of greater than about 1.5 µm.

8. The cathode as claimed in claim 1, wherein the electronically conducting material is present in an amount of about 5 to about 50% by volume, based on the total volume of the cathode.

9. The cathode as claimed in claim 1, wherein the electronically conducting material is Sr-doped $LaMnO_3$, present in an amount of about 20 to about 55% by volume, based on the total volume of the cathode.

10. The cathode as claimed in claim 1, wherein the cathode has a porosity within the range of from about 12% to about 30%.

11. A cathode comprising:
a porous ceramic material; and
at least an electronically conducting material dispersed at least partially within the pores of the porous ceramic material,
wherein the cathode has a porosity within the range of from about 10% to about 75%,
wherein the cathode is prepared by sintering the porous ceramic material first, and contacting the sintered porous ceramic material with a solution containing an oxide of the electronically conducting material,
and wherein the cathode has a higher electrical conductivity at a lower concentration of electronically conducting material, when compared to a cathode prepared by sintering both the porous ceramic material and electronically conducting material without sintering the porous ceramic material first.

12. The cathode as claimed in claim 11, wherein the porous ceramic material is selected from the group consisting of YSZ, Gd- and Sm-doped ceria (10 to 100 wt %), Sc-doped $ZrO_2$ (up to 100 wt %), doped $LaGaMnO_3$, and mixtures thereof.

13. The cathode as claimed in claim 12, wherein the porous ceramic material is YSZ.

14. The cathode as claimed in claim 11, wherein the electronically conducting material is selected from the group consisting of Sr-doped $LaMnO_3$, $LaFeO_3$, and $LaCoO_3$, Ag, and mixtures thereof.

15. The cathode as claimed in claim 14, wherein the electronically conducting material is Sr-doped $LaMnO_3$.

16. The cathode as claimed in claim 11, wherein a plurality of the pores of the cathode have an average pore size of greater than about 1.0 µm.

17. The cathode as claimed in claim 16, wherein the plurality of pores have an average pore size of greater than about 1.5 µm.

18. The cathode as claimed in claim 12, wherein the electronically conducting material is present in an amount of about 5 to about 50% by volume, based on the total volume of the cathode.

19. The cathode as claimed in claim 11, wherein the electronically conducting material is Sr-doped $LaMnO_3$, present in an amount of about 20 to about 55% by volume, based on the total volume of the cathode.

20. The cathode as claimed in claim 11, wherein the cathode has a porosity within the range of from about 12% to about 30%.

21. A cathode comprising:

a porous ceramic material defined by a plurality of pores having an inner pore wall; and at least an electronically conducting material dispersed at least partially within the pores of the porous ceramic material, whereby the inner pore wall of at least a portion of the plurality of pores is coated with the electronically conducting material, wherein the cathode is prepared by sintering the porous ceramic material first, and contacting the sintered porous ceramic material with a solution containing an oxide of the electronically conducting material and wherein the cathode has a higher electrical conductivity at a lower concentration of electronically conducting material, when compared to a cathode prepared by sintering both the porous ceramic material and electronically conducting material without sintering the porous ceramic material first.

22. The cathode as claimed in claim 21, wherein the porous ceramic material is YSZ.

23. The cathode as claimed in claim 21, wherein the electronically conducting material is selected from the group consisting of Sr-doped $LaMnO_3$, $LaFeO_3$, and $LaCoO_3$, Ag, and mixtures thereof.

24. The cathode as claimed in claim 23, wherein the electronically conducting material is Sr-doped $LaMnO_3$.

25. The cathode as claimed in claim 21, wherein a plurality of the pores of the cathode have an average pore size of greater than about 1.0 $\mu$m.

26. The cathode as claimed in claim 21, wherein the cathode has a porosity within the range of from about 12% to about 30%.

27. An electrode comprising:

a porous ceramic material; and

Sr-doped $LaCrO_3$ dispersed at least partially within the pores of the porous ceramic material, wherein the porous ceramic material includes a plurality of pores having an average pore size of at least about 0.5 $\mu$m, wherein the electrode is prepared by sintering the porous ceramic material first, and contacting the sintered porous ceramic material with a solution containing an oxide of Sr-doped $LaCrO_3$, and wherein the electrode has a higher electrical conductivity at a lower concentration of Sr-doped $LaCrO_3$, when compared to an electrode prepared by sintering both the porous ceramic material and Sr-doped $LaCrO_3$ without sintering the porous ceramic material first.

28. The electrode as claimed in claim 27, wherein the porous ceramic matrix is YSZ.

29. An electrode comprising:

a porous ceramic material; and

Sr-doped $LaCrO_3$ dispersed at least partially within the pores of the porous ceramic material, wherein the cathode has a porosity within the range of from about 10% to about 75%, wherein the electrode is prepared by sintering the porous ceramic material first, and contacting the sintered porous ceramic material with a solution containing an oxide of Sr-doped $LaCrO_3$, and wherein the electrode has a hither electrical conductivity at a lower concentration of Sr-doped $LaCrO_3$, when compared to an electrode prepared by sintering both the porous ceramic material and Sr-doped $LaCrO_3$ without sintering the porous ceramic material first.

30. The electrode as claimed in claim 29, wherein the porous ceramic material is YSZ.

31. An electrode comprising:

a porous ceramic material defined by a plurality of pores having an inner pore wall; and Sr-doped $LaCrO_3$ dispersed at least partially within the pores of the porous ceramic material, whereby the inner pore wall of at least a portion of the plurality of pores is coated with the electronically conducting material, wherein the electrode is prepared by sintering the porous ceramic material first, and contacting the sintered porous ceramic material with a solution containing an oxide of Sr-doped $LaCrO_3$, and wherein the electrode has a higher electrical conductivity at a lower concentration of Sr-doped $LaCrO_3$, when compared to an electrode prepared by sintering both the porous ceramic material and Sr-doped $LaCrO_3$ without sintering the porous ceramic material first.

32. The cathode as claimed in claim 31, wherein the porous ceramic material is YSZ.

33. A solid oxide fuel cell comprising:

the cathode of claim 1;

an anode; and an electrolyte disposed at least partially between the cathode and the anode.

34. The solid oxide fuel cell as claimed in claim 33, wherein the cathode is comprised of a material selected from the group consisting of Sr-doped $LaMnO_3$, $LaFeO_3$, $LaCoO_3$, Ag, and mixtures thereof.

35. The solid oxide fuel cell as claimed in claim 33, wherein the electrolyte is selected from the group consisting of YSZ, Sc-doped $ZrO_2$, Gd- and Sm-doped $CeO_2$, LaGaMnOx and mixtures thereof.

36. The solid oxide fuel cell as claimed in claim 33, wherein the porous ceramic material of the cathode is selected from the group consisting of YSZ, Gc- and Sm-doped ceria (10 to 100 wt %), Sc-doped $ZrO_2$ (up to 100 wt %), doped $LaGaMnO_x$, and mixtures thereof.

37. The solid oxide fuel cell as claimed in claim 36, wherein the porous ceramic material is YSZ.

38. The solid oxide fuel cell as claimed in claim 33, wherein the electronically conducting material of the cathode is Sr-doped $LaMnO_3$.

39. The solid oxide fuel cell as claimed in claim 33, wherein the plurality of pores present in the cathode have an average pore size of greater than about 1.0 $\mu$m.

40. The solid oxide fuel cell as claimed in claim 33, wherein the plurality of pores present in the cathode have an average pore size of greater than about 1.5 $\mu$m.

41. The solid oxide fuel cell as claimed in claim 33, wherein the electronically conducting material of the cathode is present in an amount of about 5 to about 50% by volume, based on the total volume of the cathode.

42. The solid oxide fuel cell as claimed in claim 33, wherein the electronically conducting material of the cathode is Sr-doped $LaMnO_3$, present in an amount of about 40 to about 55% by volume, based on the total volume of the cathode.

43. The solid oxide fuel cell as claimed in claim 33 wherein the cathode has a porosity within the range of from about 12% to about 30%.

44. A solid oxide fuel cell comprising:
a cathode;
an anode comprising:
   a porous ceramic material; and
   Sr-doped $LaCrO_3$ dispersed at least partially within the pores of the porous ceramic material,
wherein the porous ceramic material includes a plurality of pores having an average pore size of at least about 0.5 µm; and
an electrolyte disposed at least partially between the cathode and the anode,
wherein the anode is prepared by sintering the porous ceramic material first, and contacting the sintered porous ceramic material with a solution containing an oxide of Sr-doped $LaCrO_3$,
and wherein the anode has a higher electrical conductivity at a lower concentration of Sr-doped $LaCrO_3$, when compared to an anode prepared by sintering both the porous ceramic material and Sr-doped $LaCrO_3$ without sintering the porous ceramic material first.

\* \* \* \* \*

UNITED STATES PATENT AND TRADEMARK OFFICE
CERTIFICATE OF CORRECTION

PATENT NO. : 6,958,196 B2  
APPLICATION NO. : 10/369598  
DATED : October 25, 2005  
INVENTOR(S) : Gorte et al.

Page 1 of 1

It is certified that error appears in the above-identified patent and that said Letters Patent is hereby corrected as shown below:

In the Specification

Column 1, Line 17 after "material", insert:
--Government Rights
This invention was made with government support under Grant Number N00014-00-1-0311 awarded by the Navy/Office Of Naval Research. The government has certain rights in the invention.--

Signed and Sealed this
Thirteenth Day of August, 2019

Andrei Iancu
*Director of the United States Patent and Trademark Office*